United States Patent [19]

Quenin

[11] Patent Number: 4,665,932

[45] Date of Patent: May 19, 1987

[54] AUTOMATIC SAFETY DEVICE FOR FLUID DUCT

[76] Inventor: Jean-Louis Quenin, 16 rue Amédée Morel, 38000 Grenoble, France

[21] Appl. No.: 800,861

[22] Filed: Nov. 22, 1985

[30] Foreign Application Priority Data

Nov. 23, 1984 [FR] France .................................. 84 17865

[51] Int. Cl.⁴ ............................................. F16K 31/12
[52] U.S. Cl. ................................... 137/486; 137/498;
137/463; 137/462; 137/460
[58] Field of Search ............... 137/460, 462, 463, 486, 137/498

[56] References Cited

U.S. PATENT DOCUMENTS 1,322,906  11/1919  Kimball .................................. 137/463
2,044,437  6/1936  MacPherson .
2,659,383  11/1953  Frager .
2,694,408  11/1954  McRae .............................. 137/463 X

FOREIGN PATENT DOCUMENTS 37648   8/1923  Norway ................................ 137/463
287737  of 1927  United Kingdom .
313306  of 1928  United Kingdom .

Primary Examiner—Harold W. Weakley
Attorney, Agent, or Firm—Dowell & Dowell

[57] ABSTRACT

An automatically and independently operating safety device for triggering a total or partial closure of a guard or safety valve member when the velocity of a fluid circulating in a conduit attains a predetermined dangerous value. The device senses the static and total pressures of the fluid within the conduit and supplies these pressures which control the movement of a piston and rod wherein the movement of the rod in response to fluid velocities which are dangerously high will initiate the actuation of the safety valve.

13 Claims, 2 Drawing Figures

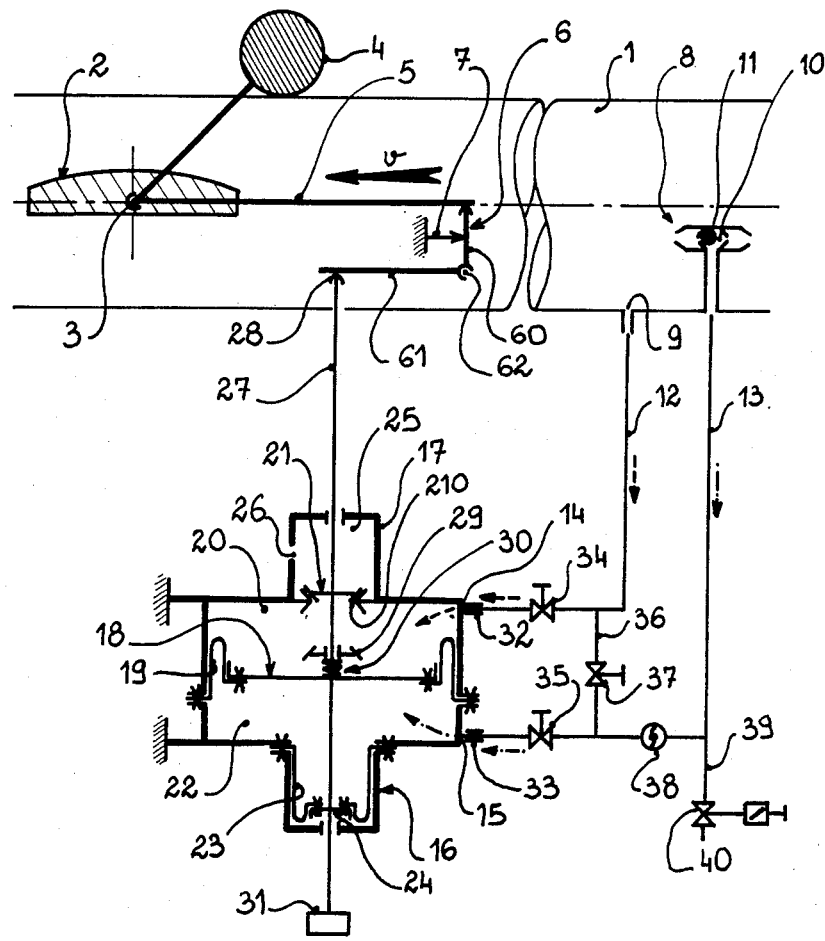
FIG: 1

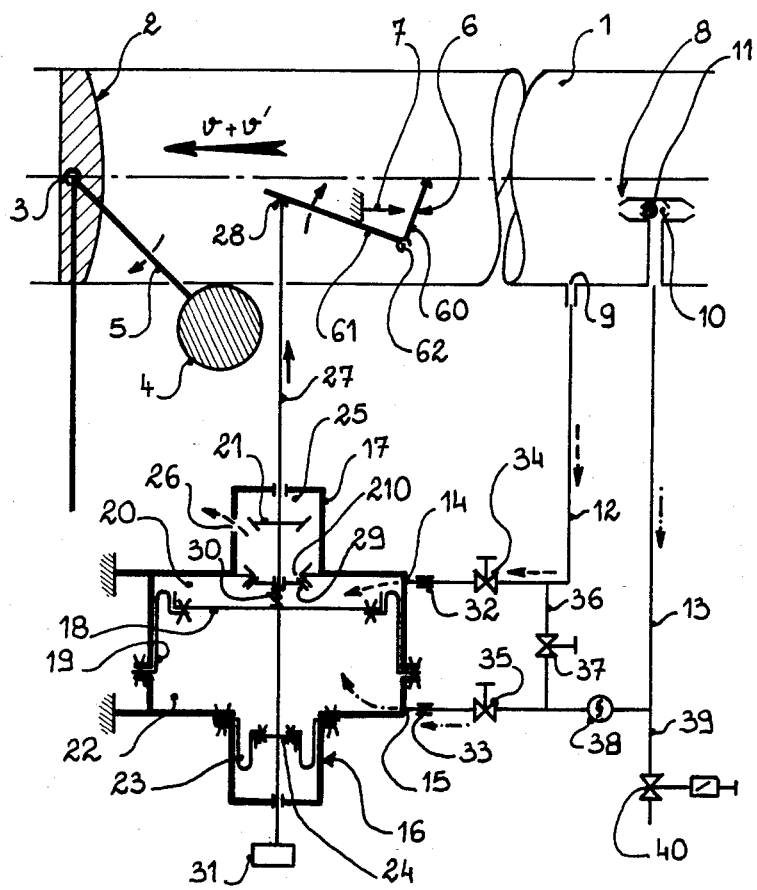
FIG: 2

AUTOMATIC SAFETY DEVICE FOR FLUID DUCT

BACKGROUND OF THE INVENTION

1. Field of the Invention

The present invention relates to a safety device which automatically and independently mechanically triggers a total or partial closure of a guard or safety member, such as valve or cock, in order to prevent fluid flow through a duct such as a pipe or conduit when the velocity of the fluid circulating in duct attains a determined value considered as dangerous.

2. History of the Art

Most forced conduits used in hydro-electric installations are provided with guard members, such as ball valves or butterfly valves. In the event of an accident in the conduit or the other equipment which is fluid communication with the conduit, such guard members are closed in order to stop the uncontrolled flow of fluid therethrough.

In general, when the fluid conveyed in a duct escapes the control of the installation, for example, by a pipe bursting, an increase in the flow velocity of this fluid results. Such increase in flow velocity is used and detected to control the closure of the guard member.

Known devices for ensuring this automatic safety are numerous. In general, they are detection devices employing turnstile, laser ray, magnetic field, or other devices, which are connected to a measuring chain and to a power device which is connected to an outside energy supply.

Such devices are complex and expensive as they utilize elaborate control systems including electronics, high-precision mechanics and the like. They necessitate the use of a measuring chain which requires continuous maintenance. Further, and in particular such systems, necessitate the use of an outside energy source, for example electricity, which considerably affects their reliability.

In order best to satisfy the requirement of simplicity and quality desired for this type of safety device, as well as to create an independence from any outside energy source, so-called "blade tripping" devices have already been used. A device of this type comprises a blade mounted in pendulum fashion in the stream of fluid and maintained perpendicular to the stream by a balancing counterweight. The blade is therefore subjected to the hydrodynamic forces created by the flow of the fluid (water in the majority of cases). When the hydrodynamic moment on the blade attains a predetermined value, the blade rotates a spindle with which it is connected. A lever device connected with this spindle then mechanically causes closure of the duct guard or valve member.

It will be readily appreciated that the mechanical power transmitted by the tipping of this blade is weak. The use of this power to trigger the closure of the guard member therefore calls upon sophisticated lever devices, which require delicate adjustment and maintenance, with the result that the system becomes overly complex and subject to failure. Furthermore, the pressure exerted by the fluid on the blade decreases when the blade inclines rearwardly. As it is moved by the fluid and thus tends to return to its starting position.

Additionally, the blade tripping device presents the other following drawbacks:

- the device for detecting the velocity of the fluid and the device for triggering the closure of the guard member are positioned at the same place or location along a fluid conduit which may be a position subject to disturbance. To this end, it would be advantageous to have a detection device placed remote from this place or location;
- the blade is gradually covered with impurities, which increases its weight and its surface area and therefore falsifies the initial adjustment;
- the device is sensitive to fluctuations in pressure, which brings a risk of untimely triggering;
- the device uses springs, which may function poorly;
- the device is fairly cumbersome;
- once in position, the device can operate only for one direction fluid flow; and
- the velocity detection device comprises moving mechanical parts.

SUMMARY OF THE INVENTION

The present invention overcomes the foregoing drawbacks and is characterized in that its detection device includes Pitot tubes having a static pressure tapping through the walls of the conduit and a total pressure tapping placed in the conduit. The pressure tappings are each connected respectively to two inlets on opposite sides of a balance acting as a differential fluid threshold amplifier. The balance includes a power outlet which is connected to a pivot device for triggering the closure of a valve or closure member in the conduit. The power for operating the power outlet is created by the pressure of fluid prevailing in the conduit at a point remote from the valve member.

The invention will be more readily understood with the aid of the following description of an embodiment applied to a forced hydraulic conduit, with reference to the accompanying drawings, in which:

BRIEF DESCRIPTION OF THE DRAWINGS

FIG. 1 is a schematic representation of the safety device of the invention, before triggering.

FIG. 2 is a schematic representation of the safety device of the invention, after triggering.

DESCRIPTION OF THE PREFERRED EMBODIMENT

Referring firstly to FIG. 1, reference 1 designates a forced hydraulic conduit in which the water flows at velocity v, in the direction indicated by the arrow. Conduit 1 is provided, in very conventional manner, with a guard or safety member 2 shown as a butterfly valve adapted to rotate about a pin 3 passing through conduit 1 perpendicularly to its longitudinal axis.

Pin 3 passes through the wall of conduit 1 by watertight means (not shown), and at least the end of this pin which is visible in the drawing is connected to a counterweight 4. When the counterweight is released, it will operate to close the valve 2 from the open position shown in FIG. 1 of the drawing.

In the position shown in FIG. 1, the counterweight 4 is in high position, and it is maintained in this position by a rod 5 secured with the end of the pin 3 and blocked in position as shown by a rocking bearing piece 6. Piece 6 has the form of a square with two sides 60, 61 and it may rotate about a pin 62. In the position shown, side 60 is vertical and abuts on a bearing 7 fixed along the path of the installation. It will be readily understood that raising side 61 makes it possible to release rod 5, and therefore to close the valve 2 under the effect of the counterweight 4.

Upstream of valve 2, at a chosen distance which may one to several hundreds of meters if necessary, there is placed a Pitot tube device 8 for measuring the velocity of fluid and, intended for the detection of an abnormal increase in flow rate v' of the water in conduit 1.

The Pitot tube device 8 conventionally includes a static pressure tapping 9 which includes an opening in the wall of the conduit 1. The Pitot tube device also includes a total pressure tapping 10 which includes a tube bent at right angles to the flow of fluid within the conduit 1 and through which the fluid may pass. The tube of the pressure tapping 10 is shown as being open at each end so as to enable the fluid tapping 10 to be responsive to fluid flow in both directions. The tapping 10 is open at each end and equipped with a ball 11 normally obstructing the downstream end of the tapping as is shown in the drawings. Ball 11 is retained against the downstream end by the effect of the fluid flowing through the bent tube.

According to the invention, the static pressure tapping 9 and total pressure tapping 10 are connected, by pipes 12 and 13, respectively, to the two inputs 14 and 15 of a hydraulic differential amplifier 16. The differential signal by way of the fluid pressure in lines 12 and 13 applied to amplifier 16 is then proportional to the square of the velocity v of the fluid in the conduit 1, as is deduced by direct application of the Bernoulli formula.

The hydraulic differential amplifier 16 includes an enclosure 17 made of pressure resistant material. The material may be stainless steel one centimeter thick. The enclosure 17 is fixed to the chassis of the surrounding installation. The amplifier further includes a central piston 18 which is supported by a membrane 19 and divides the amplifier into an upper pressure chamber 20 and a lower pressure chamber 22. The upper pressure chamber 20 is normally closed upwardly by a valve 21 and normally open through inlet 14 of pipe 12 to the static pressure tapping 9 in the hydraulic conduit 1. The lower chamber 22 is closed at its lower end by a balancing piston 24 which has the same surface area as the valve 22 and which is supported by a membrane 23. The lower chamber is open through inlet 15 and pipe 13 to the total pressure tapping 10 in conduit 1.

The amplifier also includes an uppermost chamber 25 which is open to atmospheric pressure through an opening 26. A vertical control rod 27 passes through the amplifier 16 and includes a pusher element 28 which engages the underside 61 of the rocking bearing piece 6.

The valve 21 carried on rod 27 is shown in position of closing the opening 210 in chamber 20 in FIG. 1. Another valve 29 having the same surface area as valve 21 is shaped so as to be cooperatively seated in the opposite side of the opening 210 (as shown in FIG. 2). Valve 29 is normally carried on rod 27 and fixed to the piston 18 by way of a damper spring 30.

The balancing piston 24 is also fixed on rod 27 and an adjustable weight or balancing mass 31 is provided at the lower end of the rod 27. The weight may be suitably adjustable so as to permit a high precision of accuracy to be obtained with regard to the amount of mass positioned at the end of the rod.

Furthermore, the amplifier device of the present invention includes additional secondary control elements. These secondary elements include two damping diaphragms 32 and 33 placed respectively in pipes 12 and 13 as well as two isolating cocks 34 and 35 which are also placed respectively as shown, in pipes 12 and 13. A bypass conduit 36 connects pipe 12 to pipe 13 and is equipped with a normally closed clock 37. A visual water circulation indicator 38 such as a conventional turnstile is also placed in pipe 13 and is positioned upstream of the bypass conduit 36. A conduit 39 is connected to pipe 13 and is normally closed to atmosphere by an electro-valve 30.

Operation of the amplifier control device which has just been described is as follows:

Still referring to FIG. 1, the hydraulic pressure in the upper chamber 20 of the amplifier 16 is equal to the static pressure of fluid in conduit 1, since this chamber is connected to tapping 9 by pipe 12. Similarly, the hydraulic pressure in the lower chamber 22 is equal to the total pressure in conduit 1, since this chamber is connected to tapping 10 by pipe 13. The resultant pressure exerted upwardly on the piston 18 is therefore equal to the difference between the total pressure within the conduit, and the static pressure therein, i.e., by application of the Bernoulli formula, to a term proportional to the square of the velocity v of the fluid in conduit 1 or 2.

The force of gravity applied downwardly on piston 18 by the balancing mass 31 is adjusted in order to compensate this term in $v^2$, taking into account all the forces of friction of the device. As long as the velocity of fluid v remains less than a maximum admissible value $V_M$, and with the surfaces of valve 21 and of balancing piston 24 being equal, the amplifier device is normally balanced in the position shown in FIG. 1.

In order to verify correct operation of the pressure tappings 8 and 9, i.e. to verify that they are not obstructed, cock 37 is opened for some instants and the flow is checked, with the aid of turnstile 38, to verify that a stream of fluid circulates from tapping 10 towards tapping 9, through pipes 13, 36 and 12. This check being made, cock 37 is closed again.

As long as the velocity of the fluid remains less than the critical value $V_M$, the amplifier device remains in the position of FIG. 1. If this velocity, further to a mishap in the conduit, for example, exceeds this critical value $V_M$ and reaches a value $v+v'$ for example, the difference in pressure on piston 18 becomes, at a threshold dependent on the initial adjustment of mass 31, sufficient to trigger an instant upward displacement of piston 18, and consequently of valve 21.

The valve 21 therefore opens, placing the uppermost chamber 25 at atmospheric pressure. The pressure in chamber 22 then acts alone on piston 18, with the result that the latter instantaneously moves upwardly, taking with it the rod 27, as seen in FIG. 2, to which reference will now be made.

The end 18 of the tranmission rod 27 then strikes powerfully against the arm 61 of the lever 6 which normally maintains the positioning of the counterweight 4. This lever rocks into the position shown in FIG. 2, and then releases the rod 5, and consequently the counterweight 4 which closes the butterfly valve 2, obstructing the conduit 1.

At the same time, the valve 29 has closed the opening 210, avoiding flooding of the surrounding premises in which the amplifier 16 is installed. The spring 30 dampens the impact of piston 18, avoiding the latter being deformed under the shock. It should be noted that the pressure in chamber 22 may be substantial.

In order to re-trigger the amplifier device, the electro-valve 40 is opened for a few instants, this placing chamber 22 at atmospheric pressure. The mass 31 then returns the piston 18 downwardly, which re-triggers the device. The valve 40 is then closed again. After having re-opened the butterfly valve 2, the mishap having been repaired or terminated, and having consequently returned the rod 5 into its position of blocking as shown in FIG. 1, the device is again ready for operation.

By way of example, applicants have successfully experimented the device which has just been described under the following conditions:

flow velocity v normally included between $-2$ m/l and $+2$ m/s maximum admissible velocity $V_M$ equal to 2.5 m/s diameter of the amplifier piston 18: 150 mm diameter of the triggering valve 21 and of the balancing piston 24: 50 mm adjustment of the balancing mass 31: 3.6. kg When the device was triggered, the thrust exerted on the control rod 27 was 2 tonnes.

The device of the invention is obviously not limited to the simple example which has just been described. In order to avoid any risk of gumming, the chambers 20 and 22 may be filled with an oily fluid, for example glycerine. In order to bring about a better damping than that already due to the diaphragms 32 and 33, these chambers 20 and 22 may also be filled with air, or air bells may be interposed between the tappings 8 and 9 and the inlets 15 and 14 respectively. In order to increase reliability of the device, the number of pressure tappings in the conduit may also be multiplied, these tappings being placed in parallel.

I claim:

1. In a safety control device for actuating the total or partial closure of a safety valve member which is positioned within a fluid circulating conduit and which is movable from an open to a closed position by the action of a valve operator means which is normally restrained by a linkage support system and which is released in response to a predetermined fluid velocity within the conduit which varies from the normal velocity therein comprising a differential fluid amplifier means having an enclosure, a piston means mounted within said enclosure and dividing said enclosure into first and second non-communicating chambers, a first valve means for opening said first chamber to atmosphere, a rod means extending through said first and second chambers and said piston means and being movable with said piston means, said rod means having a first end which operatively engages with the linkage support system, a static pressure tap in the conduit, a first pipe means extending between said static pressure tap and said first chamber of said fluid amplifier means so that said first chamber is maintained at a pressure equal to the static pressure of the fluid within the conduit, a total pressure tap means extending inwardly of the fluid conduit so as to open axially to the flow of fluid passing through the conduit, a second pipe means communicating said total pressure tap means with said second chamber of said fluid amplifier means so that said second chamber is maintained at a pressure equal to the total fluid pressure within the conduit, and balancing means operatively connected to said piston means to retain said piston means in a first position when the fluid flow is at a normal velocity, said piston means being movable away from said second chamber in response to a pressure difference between said first and second chambers in response to the velocity in the conduit achieving the predetermined velocity and thereby urging said rod means to activate the linkage support means to release the valve operator means which automatically acts to close the safety valve member.

2. The safety control device of claim 1 wherein said first and second chambers of said fluid amplifier means are filled with an oily liquid.

3. The safety control device of claim 1 wherein said first and second chambers of said fluid amplifier means are at least partially filled with air.

4. The safety control device of claim 1 wherein said total pressure tap means includes a tubular end portion having openings in each end thereof which are generally axially aligned with the fluid flow within the conduit.

5. The safety control device of claim 4 including a movable valve means within said tubular end portion, said movable valve means selectively closing one of said openings in said ends which is downstream of the other with respect to the directional flow of fluid within the conduit.

6. The safety control device of claim 1 including a third chamber within said enclosure, said third chamber communicating with said first chamber through a first opening having first and second valve seats formed on each side thereof, said first valve means being carried by said rod means within said third chamber and selectively closing with said first valve seat in said first opening between said third chamber and said first chamber, a second opening in said enclosure communicating said third chamber with atmosphere, and a second valve means carried by said rod means in spaced relationship from said first valve means so as to be adjacent said piston means whereby as said piston means moves toward said third chamber, said first valve means will open said first chamber to atmosphere through said first and second openings and said second valve will thereafter close said first chamber from atmosphere upon the continued movement of said piston means toward said third chamber causing said second valve means to engage said second valve seat.

7. The safety control device of claim 6 including resilient means mounted between said second valve means and said piston means for absorbing the shock of said second valve means closing with said second valve seat.

8. The safety control device of claim 1 including flow verification means having a third pipe means extending between said first and second pipe means, and valve means for opening said first and second pipe means into fluid flow communication with one another through said third pipe means and a flow indicator means communicating with said first, second and third pipe means to reflect the flow of fluid therethrough.

9. The safety control device of claim 1 including reset means for automatically resetting said fluid amplifier means, said reset means including a valve means for opening said second pipe means to atmosphere to thereby permit said piston means to move toward said second chamber of said fluid amplifier means.

10. The safety device of claim 1 in which said rod means includes a second end which extends outwardly of said enclosure from said second chamber means, said balancing means includes adjustable weight means selectively carried adjacent said second end of said rod means.

11. The safety device of claim 1 in which said static pressure tap and said total pressure tap means are remotely spaced from the safety valve member.

12. The safety control device of claim 1 including a third chamber within said enclosure, said third chamber communicating with said first chamber through a first opening having first and second valve seats formed on each side thereof, said first valve means being carried by said rod means with said third chamber and selectively closing with said first valve seat in said first opening between said third chamber and said first chamber, a second opening in said enclosure communicating said third chamber with atmosphere, and a second valve means carried by said rod means in spaced relationship from said first valve means so as to be adjacent said piston means whereby as said piston means moves toward said third chamber, said first valve means will open said first chamber to atmosphere through said first and second openings and said second valve will thereafter close said first chamber from atmosphere upon the continued movement of said piston means toward said third chamber causing said second valve means to engage said second valve seat, said rod means including a second end which extends outwardly of said enclosure from said second chamber means, and said balancing means having adjustable weight means selectively carried adjacent said second end of said rod means.

13. A safety valve and control device for totally or partially closing a conduit having fluid circulating therethrough in response to a predetermined fluid velocity which varies from normal fluid velocities within the conduit comprising, a safety valve means positioned within the fluid conduit, a weighted counterbalance means operatively connected to said safety valve means and located exteriorly of the fluid conduit, lever means connected so as to movably prevent said counterbalance means from operating to close said safety valve means with respect to the fluid conduit, a differential fluid amplifier means having an enclosure, a piston means mounted within said enclosure and dividing said enclosure into first and second non-communicating chambers, a first valve means for opening said first chamber to atmosphere, a rod means extending through said first and second chambers and said piston means and being movable with said piston means, said rod means having a first end which operatively engages said lever means, a static pressure tap in the conduit, a first pipe means extending between said static pressure tap and said first chamber of said fluid amplifier means so that said first chamber is maintained at a pressure equal to the static pressure of the fluid within the conduit, a total pressure tap means extending inwardly of the fluid conduit so as to open axially to the flow of fluid passing through the conduit, a second pipe means communicating said total pressure tap means with said second chamber of said fluid amplifier means so that said second chamber is maintained at a pressure equal to the total fluid pressure within the conduit, and balancing means operatively connected to said piston means to retain said piston means in a first position when the fluid flow is at a normal velocity, said piston means being movable away from said second chamber in response to a pressure difference between said first and second chambers in response to the fluid flow velocity in the conduit achieving the predetermined velocity and thereby urging said rod means to move said lever means and causing said counterweight means to be released to close said safety valve means.

* * * * *